(12) United States Patent
He et al.

(10) Patent No.: US 6,185,996 B1
(45) Date of Patent: Feb. 13, 2001

(54) SYSTEM AND METHOD FOR DIAGNOSING OUTPUT POWER OF AN INTERNAL COMBUSTION ENGINE

(75) Inventors: Chuan He; G. George Zhu; Dennis O. Taylor; Leslie A. Roettgen, all of Columbus, IN (US); Mark F. Bares, Oakes, ND (US); Steven G. Smith, Roseville, MN (US); Richard D. Johnston, Elizabethtown, IN (US); Yue Y. Wang, Columbus, IN (US); Emma Sweetland, Bucks (GB); James A. Rupp, Elizabethtown; Eric K. Bradley, Columbus, both of IN (US)

(73) Assignee: Cummins Engine Company, Inc., Columbus, IN (US)

( * ) Notice: Under 35 U.S.C. 154(b), the term of this patent shall be extended for 0 days.

(21) Appl. No.: 08/970,821

(22) Filed: Nov. 14, 1997

(51) Int. Cl.$^7$ ................................................. G01M 15/00
(52) U.S. Cl. .......................... 73/117.3; 73/116; 701/102
(58) Field of Search ..................................... 701/110, 111; 73/102, 119 A, 115, 116, 117.2, 117.3

(56) References Cited

U.S. PATENT DOCUMENTS

| | | | |
|---|---|---|---|
| 2,986,032 | 5/1961 | Heyer | 73/116 |
| 3,592,053 | 7/1971 | Lucia | 73/116 |
| 3,853,002 | 12/1974 | Peck | 73/116 |
| 3,938,378 | 2/1976 | Fineman et al. | 73/117.2 |
| 3,952,586 | 4/1976 | Hanson et al. | 73/117.2 |
| 4,062,232 | 12/1977 | Sutphin, Jr. | 73/117.2 |
| 4,295,363 * | 10/1981 | Buck et al. | 73/117.3 |
| 4,398,259 | 8/1983 | Levine | 73/117.3 |
| 4,539,841 | 9/1985 | Schroeder et al. | 73/116 |
| 4,546,646 | 10/1985 | Takahashi | 73/117.3 |
| 4,548,079 | 10/1985 | Klatt | 364/426 |
| 4,694,687 | 9/1987 | Bonin et al. | 73/116 |
| 4,811,223 | 3/1989 | Iwatsuki et al. | 364/424.1 |
| 5,041,980 * | 8/1991 | Maddock et al. | 701/110 |
| 5,087,881 * | 2/1992 | Peacock | 73/117.3 |
| 5,195,038 | 3/1993 | Yagi et al. | 701/103 |
| 5,331,560 | 7/1994 | Tamura | 701/115 |
| 5,365,445 | 11/1994 | Takizawa | 701/99 |
| 5,446,664 | 8/1995 | Vossen et al. | 701/101 |
| 5,452,207 | 9/1995 | Hrovat et al. | 701/70 |
| 5,462,031 * | 10/1995 | Kai | 123/478 |
| 5,465,208 | 11/1995 | Mochizuki et al. | 701/70 |
| 5,476,072 * | 12/1995 | Inventor | 123/48 AA |
| 5,501,109 | 3/1996 | Naito et al. | 73/116 |
| 5,557,519 | 9/1996 | Morita | 701/110 |
| 5,585,553 | 12/1996 | Schricker | 73/117.3 |

* cited by examiner

Primary Examiner—George Dombroske
(74) Attorney, Agent, or Firm—Woodard, Emhardt, Naughton, Moriarty & McNett

(57) ABSTRACT

A system and method for diagnosing output power of an internal combustion engine includes means for diagnosing potential causes of low engine output power or torque and means for estimating actual engine output power or torque. In a preferred embodiment of the diagnosis of engine output power, low engine output power is first investigated for authenticity to verify whether a low engine output power condition exists. If one exists, a zero fueling engine cranking test is conducted to determine whether relative compression values for each of the cylinders are within specification, and any problems associated therewith are corrected by service personnel. If the low engine output power problem is not corrected in accordance with the engine cranking test, a snap-throttle cylinder balancing test is conducted to balance the relative power contribution from each cylinder. If the cylinder balancing test does not correct the low engine output power problem, a road test is conducted to estimate the actual engine output power for comparison with a rated engine output power over a desired range of engine speeds.

22 Claims, 10 Drawing Sheets

SYSTEM AND METHOD FOR DIAGNOSING OUTPUT POWER OF AN INTERNAL COMBUSTION ENGINE

FIELD OF THE INVENTION

The present invention relates generally to techniques for diagnosing output power problems associated with internal combustion engines, and more specifically to systems for automating such techniques and for estimating actual engine output power over a desired engine RPM range.

BACKGROUND OF THE INVENTION

Manufacturers of internal combustion engines typically provide specifications indicating rated (target) power and/or torque outputs of the various manufactured engines over some specified engine speed range or ranges. At least for engines used in medium and heavy duty applications, such specifications are commonly provided as graphs or plots of engine output torque (wherein engine output torque is engine output power divided by engine speed) versus engine speed. An example of one such graph for a known Cummins M11 engine is illustrated in FIG. 1, wherein engine output torque 5 (in Newton-Meters) is plotted over an engine speed range of between 1100 and 1800 RPM.

Within the medium and heavy duty industry, one of the most common complaints from owners of such vehicles is low engine power. Heretofore, a typical technique for investigating such complaints utilized a known fault tree search technique to check all known possible causes of a low engine power condition. However, such a technique does not provide any way to determine or otherwise estimate the actual output power of the suspect engine. In cases where no cause for low engine power is found, the fault tree search technique can, at best, provide an indication that the engine should have the rated power.

What is therefore needed is a system and method for diagnosing engine output power that quickly and efficiently narrows down possible causes for low engine power and further provides a simple and efficient technique for estimating actual engine output power over a desired engine speed range for comparison with rated engine output power specifications. Such a system would provide the equipment owner with improved diagnostic service by reducing misdiagnosis of engine output power related problems and by minimizing unnecessary parts replacement.

SUMMARY OF THE INVENTION

The foregoing shortcomings of the prior art are addressed by the present invention. In accordance with one aspect of the present invention, a method of diagnosing output power of an internal combustion engine having a number of cylinders, a fueling system responsive to fueling signals to fuel the engine and means for providing the fueling signals, comprises the steps of investigating existence of a low engine output power condition and performing the following steps only if the low engine output power condition exists; correcting relative compression values of each of the number of cylinders having a relative compression value below a predefined relative compression value, adjusting the fueling signals to balance a relative contribution to engine output power of each of the number of cylinders, and operating a vehicle carrying the engine along a drive path and estimating therefrom an actual engine output power over a desired engine speed range.

In accordance with another aspect of the present invention, a method of estimating actual output power of an internal combustion engine mounted in a vehicle and connected to a transmission having a number of selectable gear ratios, the engine having a fueling system responsive to fueling signals to fuel the engine, means for a providing the fueling signals and an engine speed sensor responsive to engine speed to provide an engine speed signal, and the vehicle having a vehicle speed sensor responsive to vehicle speed to provide a vehicle speed signal, comprises the steps of starting and warming up the engine, engaging the engine with a numerically low gear ratio of the transmission, accelerating the vehicle along a drive path and through a desired engine speed range while collecting one of engine speed and vehicle speed data, coasting the vehicle along the drive path and through a desired vehicle speed range corresponding to the desired engine speed range while collecting vehicle speed data, and processing the speed data collected during the accelerating and coasting steps and computing therefrom an estimate of actual engine output power over the desired engine speed range.

In accordance with a further aspect of the present invention, a method of estimating actual output power of an internal combustion engine mounted in a vehicle and connected to a transmission having a number of selectable gear ratios and a clutch for engaging and disengaging the gear ratios, the engine having a fueling system responsive to fueling signals to fuel the engine, means for a providing the fueling signals, an engine speed sensor responsive to engine speed to provide an engine speed signal and a vehicle speed sensor responsive to vehicle speed to provide a vehicle speed signal, comprises the steps of engaging the engine with a numerically low gear ratio of the transmission, accelerating the vehicle along a drive path and through a desired engine speed range under maximum engine fueling conditions while collecting one of engine speed and vehicle speed data, coasting the vehicle along the same drive path and through a desired vehicle speed range corresponding to the desired engine speed range with the clutch disengaged while collecting vehicle speed data, and processing the speed data collected during the accelerating and coasting steps and computing therefrom an estimate of actual engine output power over the desired engine speed range.

One object of the present invention is to provide a system and method for diagnosing output power of an internal combustion engine.

Another object of the present invention is to provide a system and method for estimating actual engine output power.

These and other objects of the present invention will become more apparent from the following description of the preferred embodiments.

DESCRIPTION OF THE PREFERRED EMBODIMENTS

Figure 1:
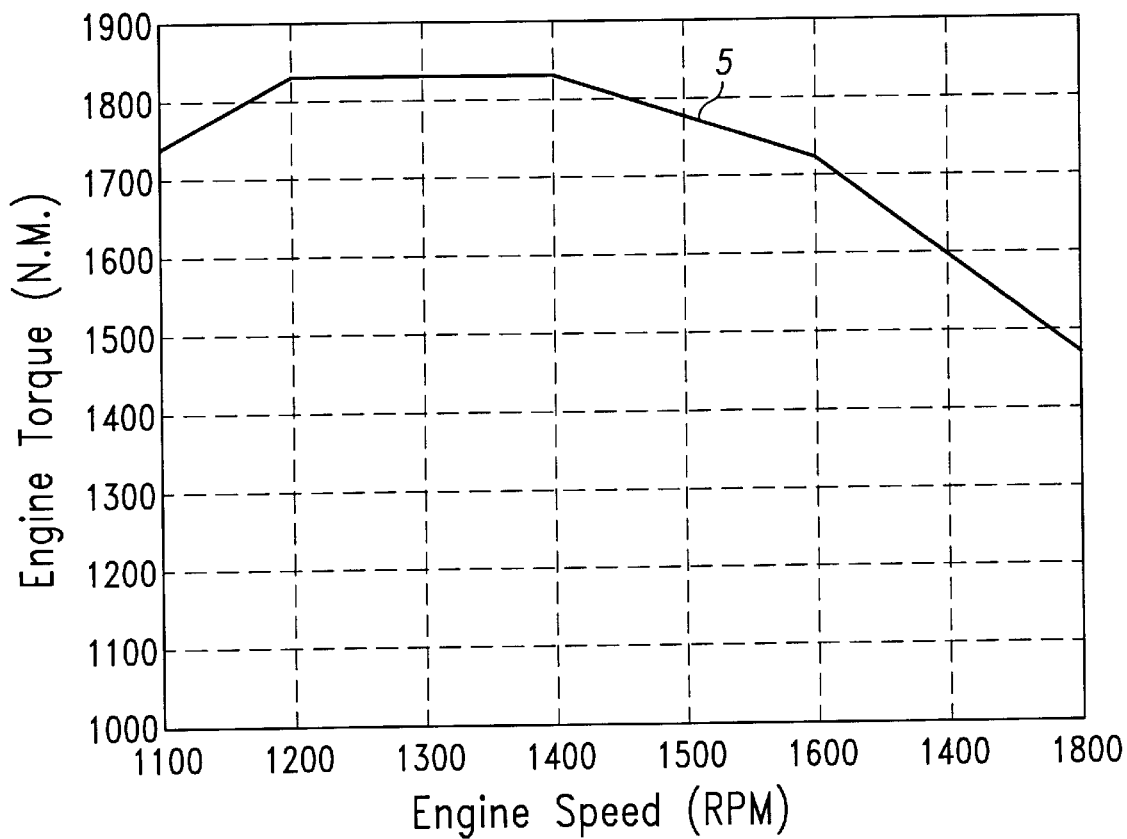
FIG. 1 is a prior art plot of rated engine output torque versus engine speed for a known heavy duty truck engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
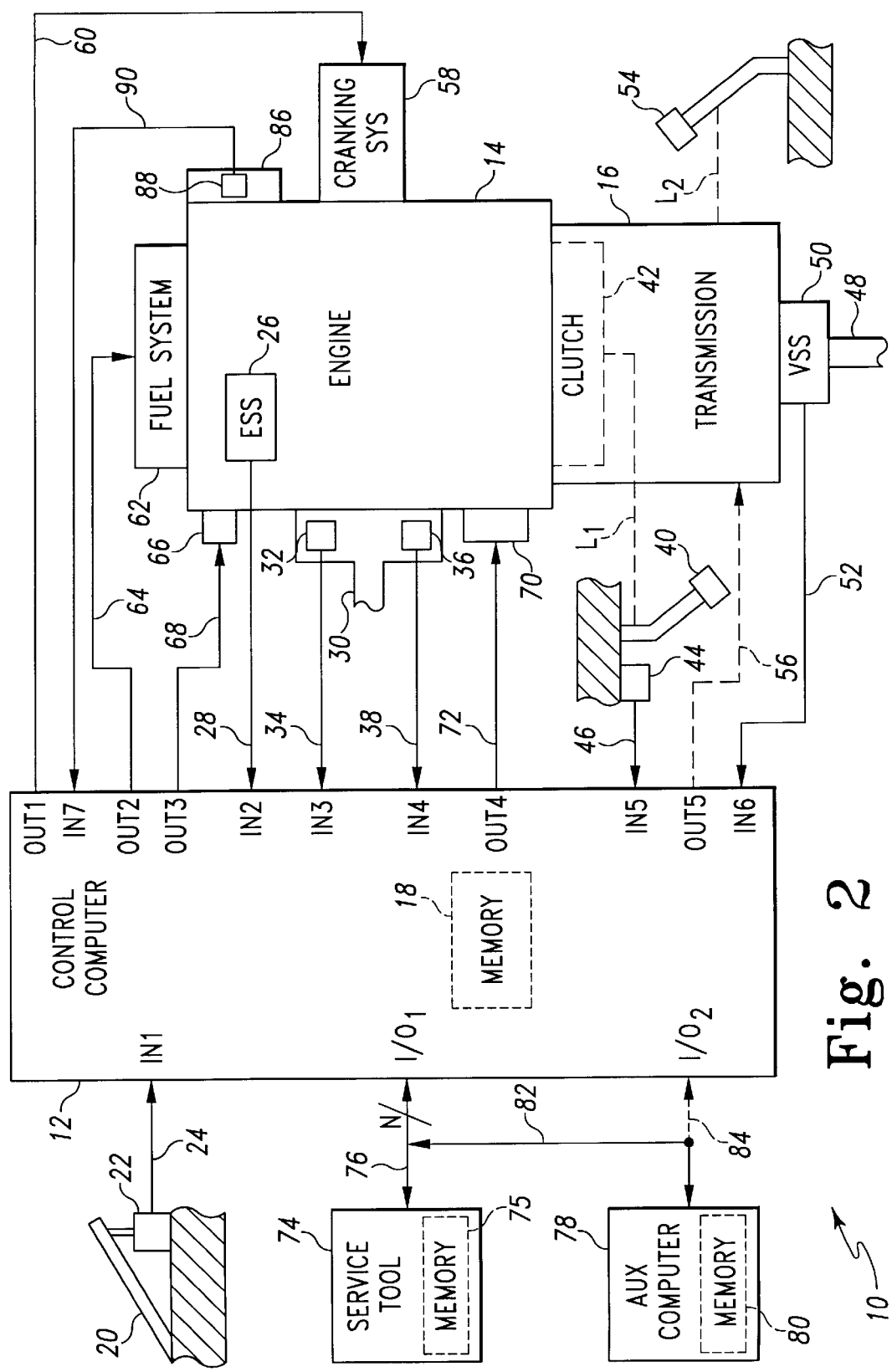
FIG. 2 is a diagrammatic illustration of a system for diagnosing low engine output power, in accordance with the present invention.

Referring now to FIG. 2, a system 10 for diagnosing low engine output power, in accordance with the present invention, is shown. System 10 includes a control computer 12, which is operable to control an engine 14 and a transmission 16 connected thereto, as is known in the art. Control computer 12 is often referred to as an engine control module (ECM), engine control unit (ECU) or the like, is preferably microprocessor-based and includes a memory unit 18. Control computer 12 is operable, as is well known in the art, to control and manage many vehicular operations, such as those associated with the operation of the engine 14 and transmission 16, in accordance with software algorithms and operational data typically stored within memory unit 18.

Many engine/vehicle sensors, switches and other vehicle/engine components interface with control computer 12 during the operation thereof, and some examples of such components, as they relate to the present invention, are illustrated in FIG. 2. For example, control system 10 includes an accelerator pedal 20 having a pedal position sensor 22 associated therewith which is electrically connected to input IN1 of control computer 12 via signal path 24. Pedal position sensor 22 is responsive to the position of accelerator pedal 20 to provide an accelerator pedal position signal to control computer 12 via input IN1. In one embodiment, the accelerator pedal position sensor 22 is a potentiometer connected at one end to a suitable voltage (such as 5 or 12 volts) and at an opposite end to ground potential. The wiper of such a potentiometer is mechanically coupled to the accelerator pedal 20, as is known in the art, and is electrically connected to signal path 24 so that the voltage present on signal path 24 is directly proportional to accelerator pedal position. Those skilled in the art will, however, appreciate that other known accelerator pedal position sensors may be used to provide the accelerator pedal position signal to control computer 12, wherein examples of some such components include, but are not limited to, pressure sensors, magnetic or HALL effect sensors and the like.

The engine 14 is preferably an internal combustion engine and includes an engine speed sensor 26 associated therewith which is electrically connected to input IN2 of control computer 12 via signal path 28. The engine speed sensor (ESS) 26 is operable to sense engine rotational speed (typically in RPMs) and/or engine position (typically in degrees relative to TDC), and provide an engine speed signal corresponding thereto on signal path 28. In one embodiment, engine speed sensor 26 is a HALL effect sensor responsive to passage thereby of a number of teeth of a gear or wheel rotating in synchronism with the engine 14 to provide the engine speed signal on signal path 28. Those skilled in the art will, however, appreciate that engine speed sensor 26 may alternatively be a variable reluctance or other known sensor operable to sense engine speed and/or position and provide a corresponding engine speed signal.

An air intake manifold 30 is connected to engine 14, as is known in the art, wherein the intake manifold 30 includes therein a known intake manifold air temperature sensor (IMATS) 32 connected to input IN3 of control computer 12 via signal path 34. IMATS 32 is operable to sense the temperature of air entering the intake manifold 30 and provide an intake manifold air temperature signal corresponding thereto on signal path 34. Intake manifold 30 further includes therein a known boost pressure sensor 36 connected to input IN4 of control computer 12 via signal path 38. The boost pressure sensor 36 is operable to sense air pressure within the intake manifold 30 and provide a boost pressure signal corresponding thereto on signal path 38. The air pressure within intake manifold 30 is typically controlled, at least under high engine load conditions, by a turbocharger (not shown) connected to the engine 14 in a known manner. The boost pressure sensor 36 is thus typically used to provide intake manifold air pressure information whenever the turbocharger is active to thereby provide control computer 12 with information relating to turbocharger operation as is known in the art.

A clutch pedal 40 is mechanically coupled to a clutch 42 of transmission 16 via linkage $L_1$. As is known in the art, clutch 42 is typically engaged (i.e. clutch 42 engages the engine 14 with a gear of transmission 16) when clutch pedal 40 is in its default position, and clutch 42 is typically disengaged (i.e. clutch 42 disengages the engine 14 from the transmission 16) when clutch pedal 40 is depressed. A clutch switch 44 is accordingly provided and connected to input IN5 of control computer 12 via signal path 46, wherein clutch switch 44 provides a signal on signal path 46 indicative of the status (i.e. engaged or disengaged) of the clutch 42. For example, if the clutch pedal 40 is depressed so as to disengage clutch 42, clutch switch 44 preferably provides a logic signal of one state on signal path 46, and if the clutch pedal 40 is not depressed so as to permit clutch 42 to be engaged, clutch switch 44 preferably provides a logic signal of an opposite state on signal path 46. Those skilled in the art will, however, recognize that any of a variety of known switches, sensors, position detectors, or the like may be used to detect clutch engagement/disengagement and provide a corresponding signal on signal path 46.

A propeller shaft 48 (typically referred to as a tailshaft) extends from transmission 16 and is rotatably driven thereby as is known in the art. A vehicle speed sensor (VSS) 50 is, in one embodiment, positioned about tailshaft 48 and is electrically connected to an input IN6 of control computer 12 via signal path 52. Alternatively, the vehicle speed sensor 50 could be connected to an input of a control computer associated with transmission 16 (not shown), wherein such a control computer could pass the vehicle speed information to control computer 12 via a suitable data link such as an SAE J1939 serial data link. In either case, vehicle speed sensor 50 is operable to sense vehicle speed and provide a vehicle speed signal to control computer 12 corresponding thereto. In one embodiment, vehicle speed sensor 50 is a variable reluctance sensor, although the present invention contemplates that the vehicle speed sensor 50 may be any known sensor positioned at a suitable vehicle location, wherein such a sensor is operable to provide control computer 12 with a signal indicative of vehicle speed.

An engine cooling system 86, typically comprising a radiator and cooling fluid disposed therein (not shown) for circulation within the engine 14 as is known in the art, includes therein a coolant fluid temperature sensor 88 connected to input IN7 of control computer 12 via signal path 90. Coolant fluid temperature sensor 88 may be any known fluid temperature sensor operable to sense the temperature of coolant fluid and provide a coolant temperature signal corresponding thereto on signal path 90. As it relates to the present invention, the coolant fluid sensor 88 is preferably used to determine whether the engine 14 is warmed up, typically by determining whether the coolant temperature is in excess of a threshold temperature. Those skilled in the art will recognize that while a coolant fluid temperature sensor is used in one embodiment of the present invention for determining engine operating temperature, other known engine operating temperature sensors and/or systems may alternatively be used without detracting from the concepts described herein.

Transmission 16 may, in accordance with the present invention, be a manual transmission having a number of manually selectable gear ratios, a manual-automatic transmission having a number of manually selectable gear ratios and a number of automatically selectable gear ratios. In either case, a manual gear shifting lever 54, suitably located in the cab area of the vehicle, is coupled to transmission 16 via linkage $L_2$, and is manually actuatable by a vehicle operator to control manual shifting of transmission 16 between the number of manually selectable gear ratios thereof, as is known in the art. Control of shifting between any one or more automatically selectable gear ratios of transmission 16 is typically performed by control computer 12 or by another control computer associated with transmission 16 and connected to control computer 12 via a J1939 or equivalent serial data link, and control signals corresponding thereto are provided to transmission 16 via signal path 56 connected to output OUT5 of control computer 12. Alternatively, transmission 16 may be a known autoshift transmission wherein control computer 12 is operable to control shifting between gear ratios thereof as is known in the art.

Control computer 12 includes a first output OUT1 electrically connected to a cranking system 58, associated with the engine 14, via signal path 60. Cranking system 58 may be any known cranking system including a starter motor, etc. (not shown), and is responsive to cranking control signals provided thereto by control computer 12 on signal path 60 to crank the engine 14.

Control computer 12 includes a second output OUT2 electrically connected to a fuel system 62, associated with the engine 14, via signal path 64. Fuel system 62 may be any known fuel system including one or more fuel injectors, etc. (not shown), and is responsive to fuel control signals provided thereto by control computer 12 on signal path 64 to fuel the engine 14 accordingly.

Control computer 12 includes a third output OUT3 electrically connected to a climate control system 66 via signal path 68. Climate control system 66 may be any known climate control system having an air conditioning portion including a cooling fan driven by the engine 14, condenser, etc. (not shown) and/or a heater portion including heating elements, etc. (not shown), and is responsive to climate control signals provided thereto by control computer 12 on signal path 68 to correspondingly control air temperature within the cab area of the vehicle. Alternatively, climate control system 66 may be controlled manually or via another control computer (other than control computer 12).

Control computer 12 includes a fourth output OUT4 electrically connected to air compressor system 70, associated with engine 14, via signal path 72. Air compressor system 70 may be any known air compressor system providing compressed air for certain vehicle subsystems such as service brakes, etc. (not shown), and is responsive to air compressor control signals provided thereto by control computer 12 on signal path 72 to recharge the air compressor system 70 (i.e. add compressed air to a holding tank, or wet tank (not shown)). Alternatively, air compressor system 70 may be controlled manually or via another control computer (other than control computer 12).

System 10 further includes a known service tool 74, which is typically computer-controlled and has a memory portion 75, and which is electrically connected to input/output port $I/O_1$ of control computer 12 via a number, N, of signal paths 76, wherein N may be any integer. In one embodiment, signal paths 76 make up a known 2-wire serial data link which is preferably configured and operates in accordance with the Society of Automotive Engineers (SAE) J1587 or J1939 protocol. In accordance with J1587 or J1939 standards, information relating to various engine and vehicle operating parameters is continuously broadcast onto the data link 76 in real-time. Examples of such information include, but are not limited to, engine speed, vehicle speed, engine load, % throttle (accelerator pedal position), and the like. Moreover, control computer 12 is operable to import data from any suitable source, such as a computer-controlled service tool 74 or other auxiliary computer, connected to the data link 76. Also provided is an auxiliary computer 78, having a memory portion 80, that is preferably connectable to the data link 76 via signal path 82. Alternatively, auxiliary computer 78 may be connected to a second serial input/output port $I/O_2$ of control computer 12 for communicating therewith. In accordance with a preferred embodiment of the present invention, many of the computer executable portions of the software algorithms for diagnosing engine power, which will be discussed in greater detail hereinafter, are executed by either the service tool 74 (via software stored in memory 75) or the auxiliary computer 78 (via software stored in memory 80). Those skilled in the art will, however, recognize that control computer 12 may alternatively be configured to execute such algorithms (via software stored in memory 18), wherein any results of such computations may be downloaded in a known manner via service tool 74 or auxiliary computer 78.

Figure 3A:
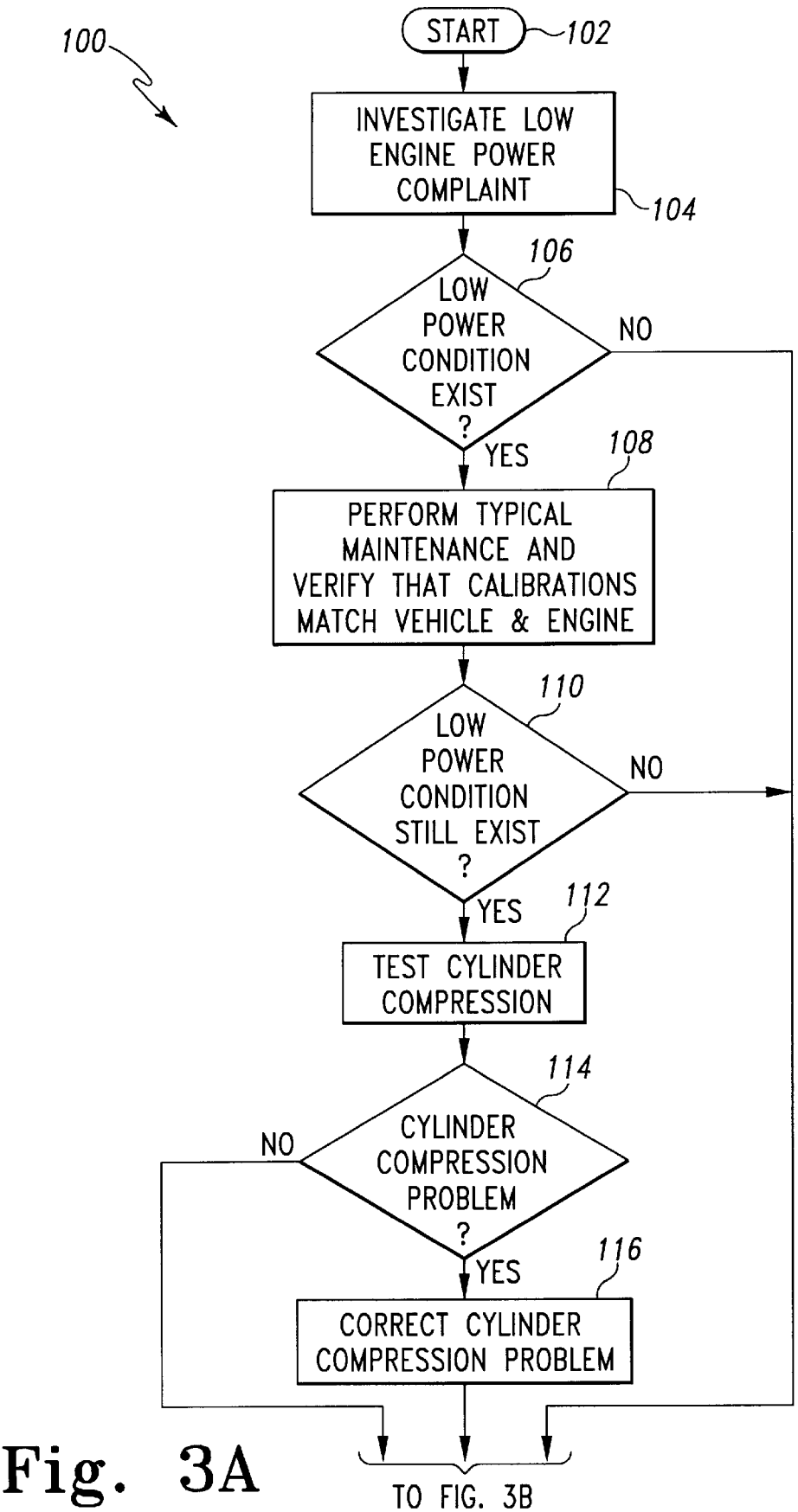
FIG. 3A is composed of FIGS. 3A–3C and is a flowchart illustrating a software algorithm, executable by the system of FIG. 2, for diagnosing low engine output power in accordance with one aspect of the present invention.
Figure 3B:
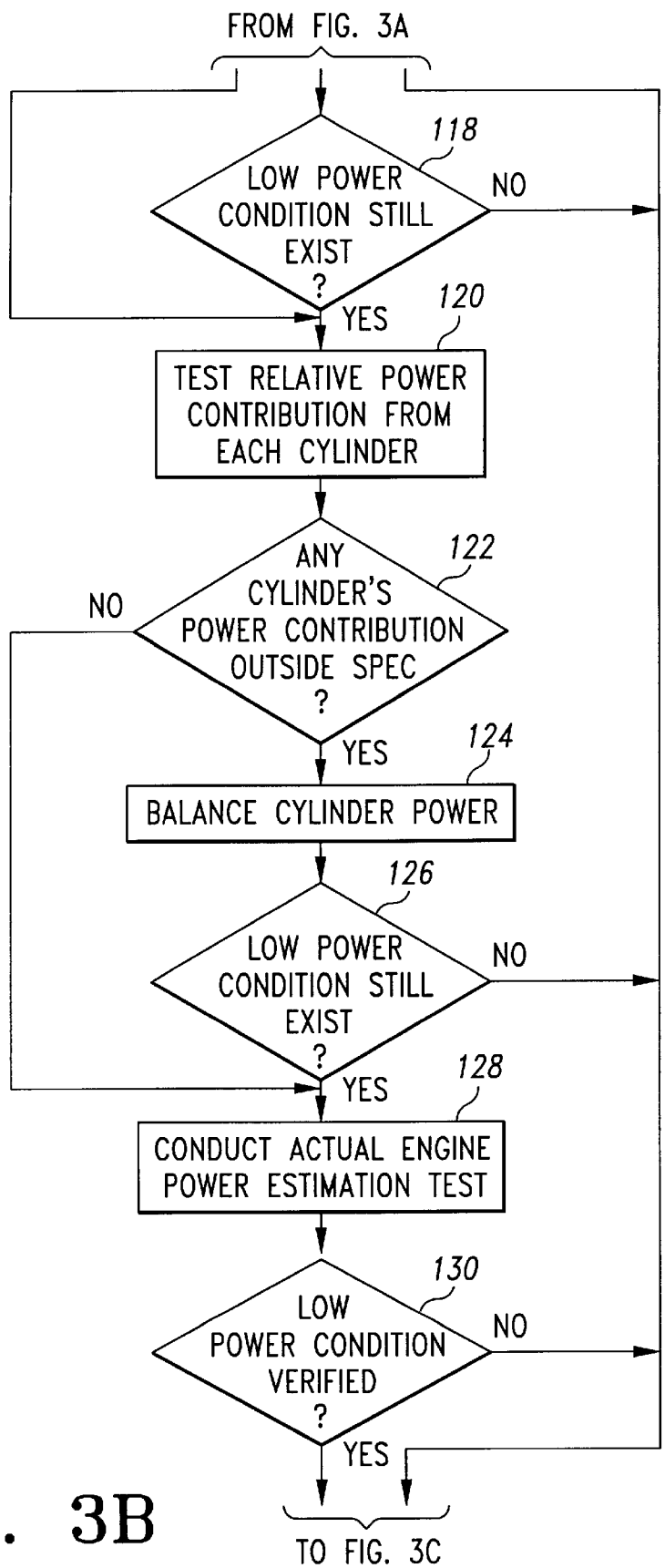
Figure 3C:
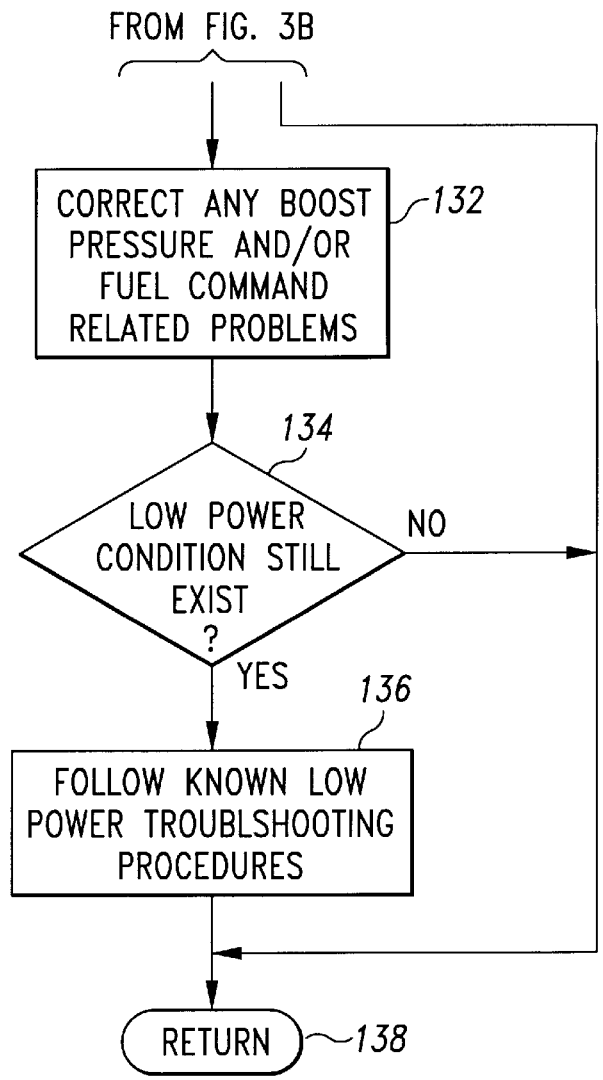

Referring now to FIG. 3, which is composed of FIGS. 3A–3C, a flowchart is shown which illustrates an algorithm 100 for diagnosing engine output power, in accordance with one aspect of the present invention. As will be described in greater detail with respect to FIGS. 3A–3C, portions of algorithm 100 describe steps to be carried out by maintenance personnel, while other portions of algorithm 100 describe steps to be executed by a computer (such as the service tool 74 or auxiliary computer 78). Referring now to FIG. 3A, algorithm 100 begins at step 102, and at step 104, the low engine power complaint is investigated. In a preferred embodiment of algorithm 100, step 104 is performed by maintenance personnel in the form of one or more driver interviews. Through such driver interviews, maintenance personnel will form an opinion, based on their knowledge of engine operation, as to whether the low engine output power complaint is valid.

Hereinafter, the terms engine output power and engine output torque will be used interchangeably, it being understood that the two are related as a function of engine speed.

Algorithm execution continues from step 104 at step 106 where a maintenance or service person determines from the results of the investigation of step 104 whether a valid low engine power condition exists. If, at step 106, the maintenance or service person determines that a valid low engine power condition exists, algorithm execution continues at step 108. Otherwise, algorithm execution continues at step 138 where the algorithm 100 is returned to its calling routine.

At step 108, maintenance or service personnel perform typical vehicle/engine maintenance procedures to rule out at least some of the possible causes for low engine output power. For example, step 108 may include checking the vehicle/engine maintenance records and performing any required maintenance, examining the physical condition of the vehicle/engine, including checking the condition of the tires, oil and fuel, and correcting any problem associated therewith. In addition, step 108 includes checking the vehicle/engine calibration information stored within memory 18 of control computer 12, and verifying that such calibration information matches the calibration information appropriate for the particular engine and vehicle type and configuration. After correcting any and/or all problems or inconsistencies discovered at step 108, algorithm execution continues at step 110 where it is determined whether the low engine power condition continues to exist. Step 110 is preferably performed by repeating step 104. If, at step 110, it is determined that the low engine output power condition still exists, either because no problems or inconsistencies were found at step 108 or because low engine output power continues to exist after addressing any problems or inconsistencies found at step 108, algorithm execution continues at step 112. Otherwise, algorithm execution continues from step 110 at step 138.

At step 112, service or maintenance personnel conduct a cylinder compression test to determine relative cylinder compression in each of the number of cylinders of engine 14. In one embodiment of algorithm 100, the cylinder compression test of step 112 is preferably performed automatically under the management of the service tool 74, auxiliary computer 78 or control computer 12, and preferably comprises an engine cranking test. Under the direction of an appropriate one of the computers, the cranking system 58 is controlled, as are the fueling signals provided to fuel system 62, to command the fueling system 62 to produce a zero engine fueling signal, further command cranking system 58 to crank the engine 14 under such fueling conditions and collect engine speed data while so cranking the engine 14. A relative compression value for each cylinder is computed using well known equations based on engine speed information (i.e. a compression value for each cylinder relative to each of the other cylinders).

Algorithm 100 continues from step 112 at step 114 where the results of the cylinder compression test of step 112 are evaluated. In one embodiment, service or maintenance personnel perform step 114 by comparing the results of the cylinder compression test of step 112 with cylinder compression target ranges and determining whether any of the relative cylinder compression values are outside a specified range of values. Alternatively, any one of the computers 74, 78 or 12 may be programmed with the target compression ranges, and may further perform step 114 by automatically conducting the comparisons. In either case, if any such relative cylinder compression values are outside the specified range of values at step 114, or if any other cranking test related problems are discovered, algorithm 100 proceeds to step 116 where any such problems are corrected by service or maintenance personnel. Thereafter, algorithm execution advances to step 118 where a determination is made, preferably by service/maintenance personnel, as to whether the low engine output power condition still exists. If, as a result of step 118, it is determined that the low engine output power no longer exists, algorithm execution continues at step 138. If, at step 118, low engine output power is still found to exist, or if at step 114 no cylinder compression problems were found, algorithm execution continues at step 120.

At step 120, service or maintenance personnel conduct a test of the relative contribution to engine output power of each of the cylinders. While the present invention contemplates utilizing any known cylinder balancing technique for conducting such a test, a snap-throttle test is preferably used. The snap-throttle cylinder power balance test, which will be described hereinafter, requires individual cylinder fuel cut-off. However, the present invention recognizes that not all internal combustion engine configurations are capable of individual cylinder fuel cut-off, and for those such engines, other cylinder power balancing tests not requiring individual cylinder fuel cut-off may be used.

Step 120 may be performed by an appropriate one of any of the computers 74, 78 or 12, and preferably comprises commanding maximum fuel (100% throttle or accelerator pedal deflection) to thereby cause the engine 14 to accelerate from an idle speed to a maximum engine speed while fuel to different ones of the cylinders are cut-out, and an engine acceleration rate is computed (in accordance with known equations) while fuel is cut to each of the cylinders. Thus, for a six cylinder engine, for example, step 120 will result in computation of six engine acceleration rates; one engine acceleration rate for each fuel-cut cylinder. By comparing each of the computed engine acceleration rates, the relative power contribution to overall engine output power attributable to each cylinder is then calculated by an appropriate computer. Further details of such a snap-throttle test for determining each cylinder's relative power contribution is given in co-pending U.S. patent application Ser. No. 08/971, 071, now U.S. Pat. No. 6,002,980 filed Nov. 19, 1997 by Taylor et al. and assigned to the assignee of the present invention, which application is incorporated herein by reference.

Algorithm execution continues from step 120 at step 122 where the relative power contributions of each cylinder, as computed at step 120, are analyzed by comparing these power values with a specified power range. Step 122 may be performed by service or maintenance personnel, or may be performed automatically by any of the computers 74, 78 or 12 wherein the specified power range values are stored within a corresponding memory. In any case, if any of the cylinders are determined at step 122 to exhibit a relative power contribution that is outside of the specified power range, algorithm execution continues at step 124. Otherwise, algorithm execution continues at step 128.

At step 124, the output power of the various cylinders are balanced. It is to be understood that step 124 may comprise either or both of the steps of repairing any cylinder or fuel delivery-related component, where necessary, and conducting a known computer-controlled power balancing control algorithm which causes control computer 12 to adjust the fueling signals provided to the fueling system 62 to thereby balance or equalize the relative output power contribution of each of the cylinders to overall engine output power. Algorithm execution continues from step 124 at step 126 where a determination is made, preferably by service/maintenance personnel, as to whether the low engine output power is again tested to determine whether the low engine output power condition still exists. If, as a result of step 124, it is determined that the low engine output power no longer exists, algorithm execution continues at step 138. If, at step 126, low engine output power is still found to exist, or if at step 122 each of the cylinder's relative power contribution was found to be within the specified power range, algorithm execution continues at step 128.

At step 128, service or maintenance personnel conduct a road test to estimate the actual engine output power over a desired engine speed range. Advantageously, this technique provides for a relatively quick estimate of actual engine output power, which does not require any additional sensors or subsystems other than a service tool 74 or an auxiliary computer 78. Preferably, the road test of step 128 is performed, at least partially, by the service tool 74 or auxiliary computer 78 since a control computer 12 typically does not include sufficient memory 18 to store the necessary data. However, those skilled in the art will recognize that control computer 12 may easily be configured to perform step 128 if provided with sufficient memory, either by adding storage capacity to memory 18 or by supplementing memory 18 with an additional memory unit as is known in the art. Further details of a preferred embodiment for performing step 128 will be described hereinafter with respect to FIGS. 4–8.

Algorithm execution advances from step 128 to step 130 where results of the actual engine output power estimation test of step 128 are analyzed to determine whether a low engine output power condition can be verified. If it cannot, algorithm execution continues at step 138. If, at step 130, a low engine output power condition can be verified, algorithm execution continues at step 132. In one embodiment, step 130 includes comparing the estimated actual engine output power over the desired engine speed range resulting from step 128 with a rated (target) engine output power over the desired engine speed range, and verifying the existence of a low engine output power condition if the rated engine output power over the desired engine speed range exceeds the estimated actual engine output power over the desired engine speed range by some error amount. One preferred technique for making such a determination requires computing the area under the power or torque curve for the rated engine output over the desired engine speed range, computing the area under the power or torque curve for the estimated engine output over the desired engine speed range, and computing a ratio thereof. In terms of engine output torque, this ratio can be represented by the equation:

$$\text{Error} = [(\int T_e(\text{spd})d\text{spd}/\int T_r(\text{spd})d\text{spd}) - 1] * 100\% \quad (1);$$

where $T_e(\text{spd})$ is the estimated actual engine output torque, $T_r(\text{spd})$ is the rated engine output torque, spd is the desired engine speed range and Error is the absolute percentage error therebetween. If Error is less than some predefined error threshold, a low engine output power condition is verified. In one embodiment, the predefined error threshold is set at 5%, although the present invention contemplates using other threshold values, wherein any error value less than the error threshold corresponds to a valid low engine output power condition. It should also be apparent from equation (1) that the value of Error also provides for a measure of deviation of the estimated actual engine output power (or torque) from the rated engine output power (or torque) to thereby provide a quantitative estimate of engine output power. It should also be understood that step 130 may be performed manually by service or maintenance personnel, or automatically by one of the computers 74, 78 or 12 wherein at least the rated engine output power and error threshold data are stored in an appropriate memory.

If, at step 130, a low engine output power condition is verified, algorithm execution advances to step 132 where service or maintenance personnel perform any required corrections or repairs. Indications of required corrections and/or repairs are provided by transient data collected during step 128, wherein such data may include boost pressure readings provided by boost pressure sensor 36, fuel timing information relating to the fueling signals provided by control computer 12 to the fuel system 62, and the like. Other transient data relating to engine and/or vehicle operation during step 128 may also be collected as will be described more fully hereinafter.

From step 132, algorithm 100 advances to step 134 where a determination is made, preferably by service/maintenance personnel, as to whether the low condition still exists after making repairs/corrections at step 132. If, as a result of step 134, it is determined that the low engine output power no longer exists, algorithm execution continues at step 138. If, at step 134, low engine output power is still found to exist, algorithm execution continues at step 136 where service or maintenance personnel follow known low engine output power troubleshooting procedures such as, for example, those set forth in the BACKGROUND SECTION. From step 136, algorithm advances to step 138 where algorithm execution either ceases or returns to a calling routine.

Figure 4:
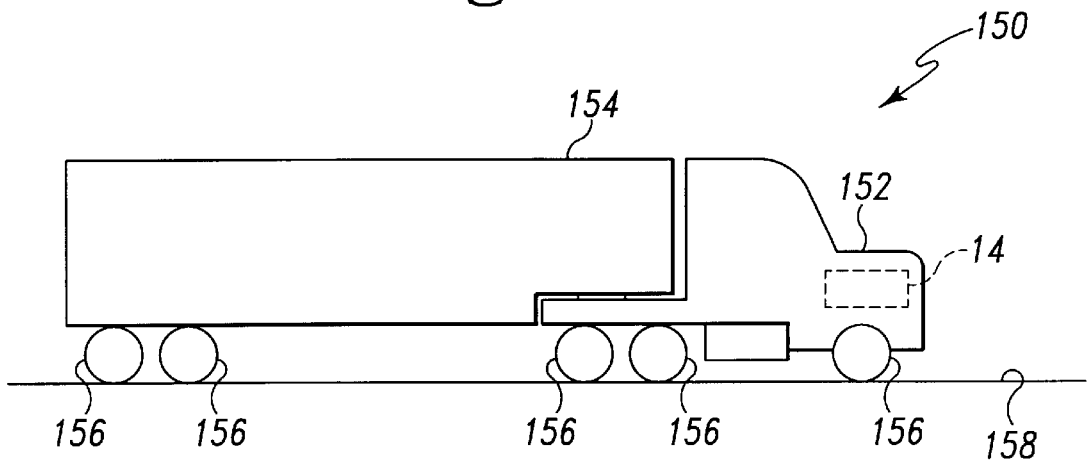
FIG. 4 is a diagrammatic illustration of a fully loaded tractor truck for performing an engine output power estimation test according to another aspect of the present invention.
Figure 5A:
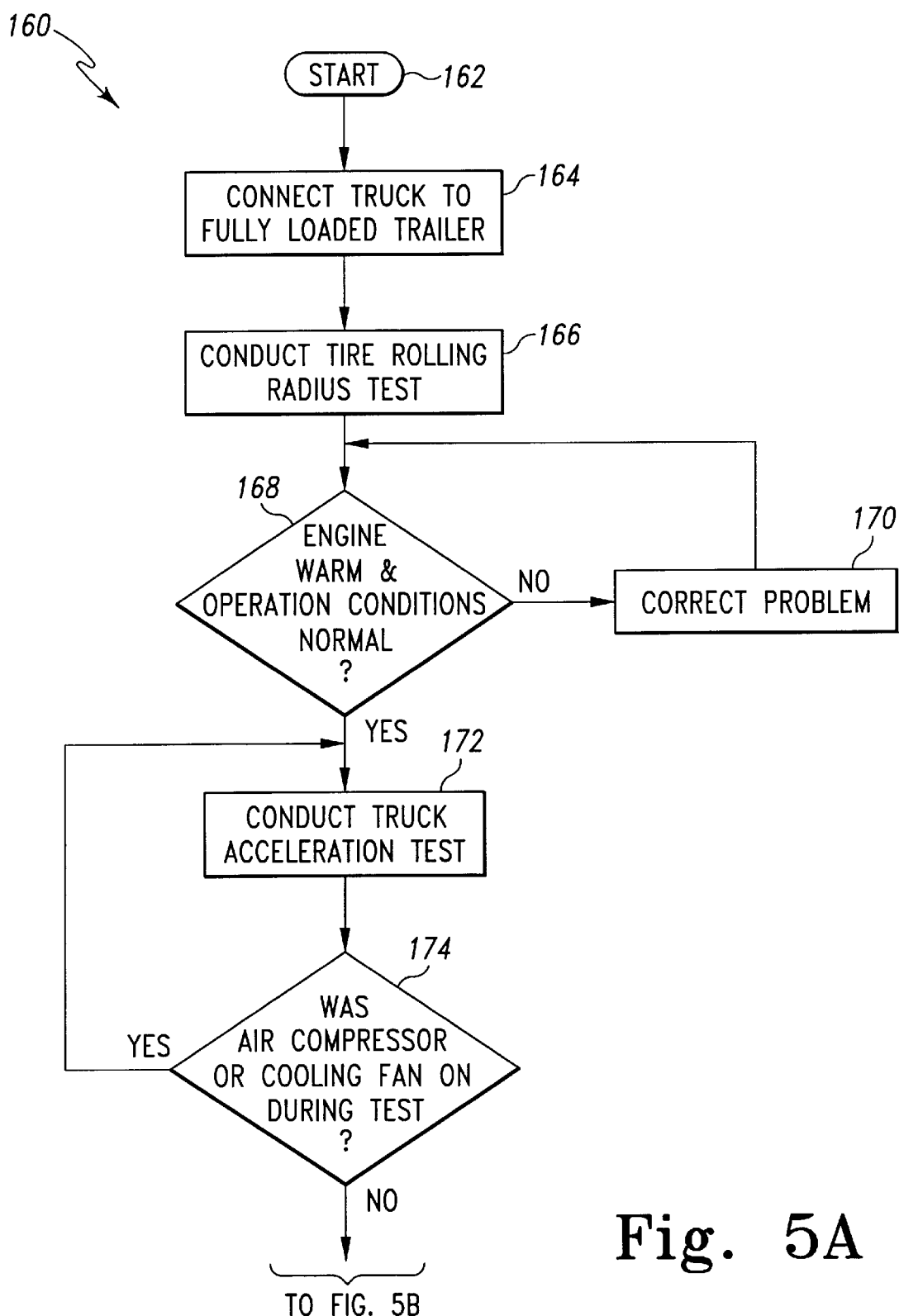
FIG. 5 is composed of FIGS. 5A–5B and is a flowchart illustrating one embodiment of a software algorithm, execut
Figure 5B:
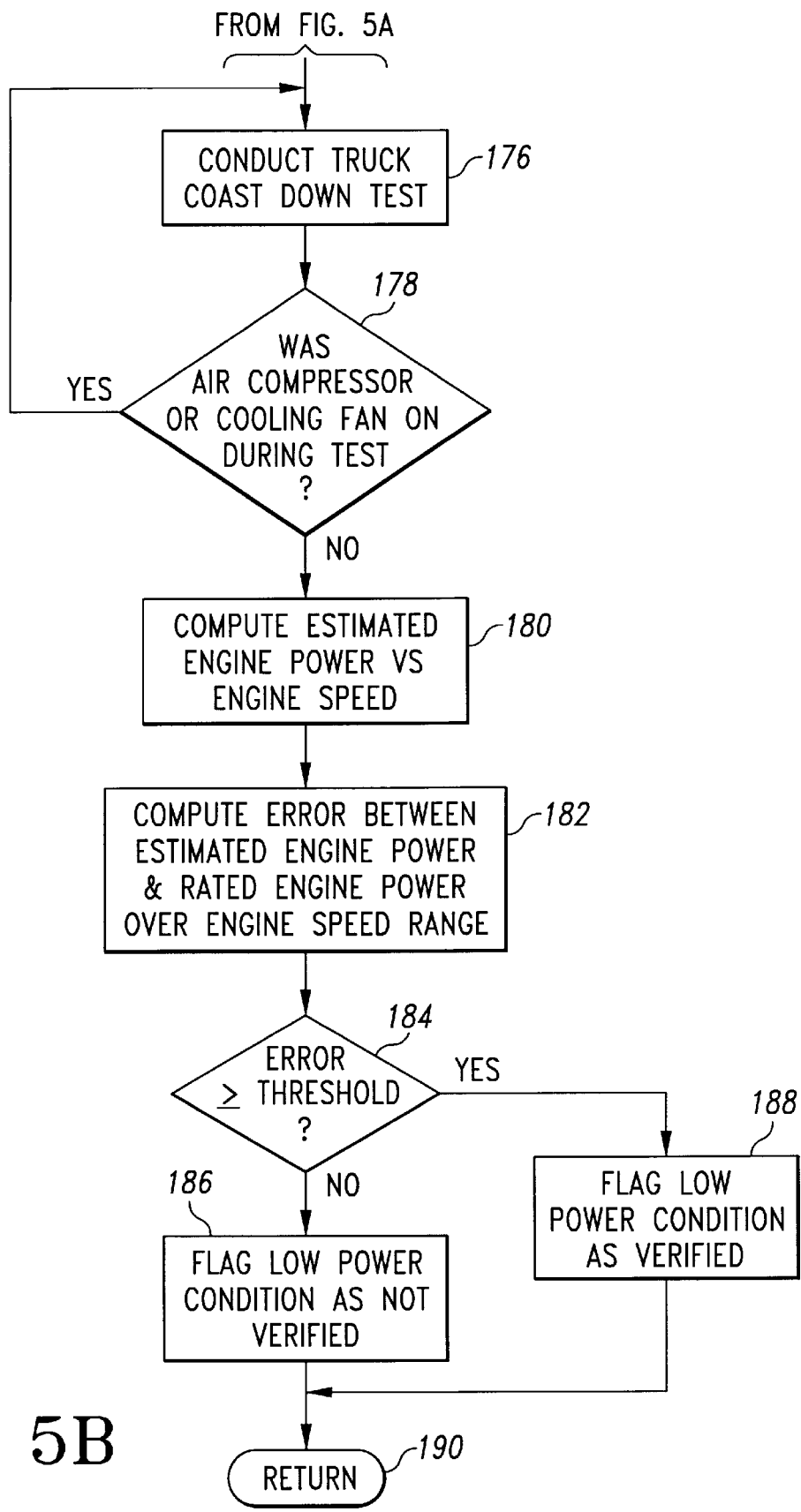

Referring now to FIGS. 4–8, a preferred embodiment of a road test technique for estimating actual engine output power (or torque), as indicated at step 128 of FIG. 3B, is shown. Referring specifically to FIG. 4, a vehicle 150 is shown, which is illustrated as a tractor truck 152 having the internal combustion engine 14 disposed therein, a trailer 154 attached thereto and a number of tires 156 in contact with a drive path 158. Referring to FIG. 5, which is composed of FIGS. 5A and 5B, a flowchart is shown which illustrates an algorithm 160 for estimating actual engine output power, in accordance with another aspect of the present invention. As will be described in greater detail with respect to FIGS. 5A and 5B, portions of algorithm 160 describe steps to be carried out by maintenance personnel, while other portions of algorithm 160 describe steps to be executed by a computer (such as the service tool 74 or auxiliary computer 78). Referring now to FIG. 5A, algorithm 160 begins at step 162, and at step 164, service or maintenance personnel connect the tractor truck 152 to a fully loaded trailer 154. The total weight of the tractor/trailer combination should be known, either by weighing the same or via some known weight/mass estimation algorithm. During the power estimation algorithm 160, it is preferable that the engine 14 is exercised at maximum engine power in order to accurately estimate engine output power over the desired engine speed range. Accordingly, it is advantageous to fully load the trailer 154 in order to ensure that the boost pressure will be high enough during the test to make the engine work at maximum power.

Algorithm execution continues from step 164 at step 166 where service or maintenance personnel conduct a tire rolling radius check, wherein the resulting tire radius information is used by the engine output power estimation algorithm in converting engine speed to vehicle speed as will be more fully described hereinafter. Preferably, the tire rolling radius check is conducted by determining a number of tire revolutions required to move vehicle 150 some predefined distance. As one example, the tire rolling radius check may be conducted by determining a number of revolutions of any of the tires 156 that is required to move the vehicle 150 one mile. It is to be understood, however, that while a tire rolling radius check has been described as being useful in the engine output power estimation algorithm 160 for converting engine speed to vehicle speed, other known techniques for performing this conversion may alternatively be used.

Algorithm execution continues from step 166 at step 168 where a determination is made as to whether the engine 14 is warmed up and all operating conditions are normal. In one embodiment, a determination of whether the engine is warmed up is done automatically by an appropriate one of the computers 74, 78 or 12 by sensing engine temperature, after the engine 14 has been started, and determining that the engine is warmed up if the engine temperature exceeds some temperature threshold. Preferably, the coolant sensor 88 is used to provide an indication of engine temperature, although other known sensors or subsystems from which engine temperature can be derived or estimated may alternatively be used. In an alternative embodiment, the determination of whether the engine is warmed up may be made by service or maintenance personnel by monitoring an engine temperature gauge after starting engine 14, and verifying that the engine 14 is warmed up after the engine temperature has reached some threshold temperature.

Step 168 also includes checking vehicle/engine operating conditions for normal operation thereof. This includes, for example, turning off the climate control system 66 so that the cooling fan (not shown) is off, and turning off all other accessories and depressing the service brake (not shown) to ensure that the air compressor 70 is recharged. If, at step 168, either the engine has not yet warmed up or one or more of the vehicle/engine operating conditions is abnormal, algorithm execution continues at step 170 where the one or more corresponding problems are fixed or addressed by service or maintenance personnel, and step 170 then loops back to step 168. If, however, the engine is warmed up and all vehicle/engine operating conditions are normal, algorithm execution continues at step 172 where a vehicle acceleration test is conducted. Details of one embodiment of a vehicle acceleration test, in accordance with yet another aspect of the present invention, will be discussed in greater detail hereinafter with respect to FIG. 6. However, it bears pointing out here that during the vehicle acceleration test of step 172, both the air compressor 70 and climate control system 66 are monitored for activity, and the service brake should not be depressed.

Algorithm execution continues from step 172 at step 174 where it is determined whether either the air compressor 70 or climate control system 66 were active during the acceleration test of step 172, or if the service brake was depressed during the test. If so, all transient data collected during the acceleration test is discarded and the algorithm 160 loops back to step 172 to repeat the acceleration test. If, and/or when, the acceleration test of step 172 is completed without any climate control system 66, air compressor 70 or service brake activity, algorithm execution continues at step 176 where a vehicle coast down test is conducted. Details of one embodiment of a vehicle coast down test, in accordance with a further aspect of the present invention, will be discussed in greater detail hereinafter with respect to FIG. 7. However, as with the acceleration test of step 172, it bears pointing out here that during the vehicle coast down test of step 176, both the air compressor 70 and climate control system 66 are monitored for activity, and the service brake should not be depressed.

Algorithm execution continues from step 176 at step 178 where it is determined whether either the air compressor 70 or climate control system 66 were active during the coast down test of step 176, or if the service brake was depressed during the test. If so, all transient data collected during the coast down test is discarded and the algorithm 160 loops back to step 176 to repeat the coast down test. If, and/or when, the coast down test of step 176 is completed without any climate control system 66, air compressor 70 or service brake activity, algorithm execution continues at step 180 where the estimate of engine output power (or torque) over the desired engine speed range is computed based on information collected during the vehicle acceleration test of step 172 and the vehicle coast down test of step 176. Details of some of the computations of step 180, as well as an application example thereof, will be described after discussing details of preferred embodiments of the acceleration test of step 172 and the coast down step of 176.

From step 180, algorithm execution continues at step 182 where an error between the estimated actual engine output power (or torque) and rated engine output power (or torque) over the desired engine speed range is computed. Preferably, step 182 is conducted in accordance with equation (1) above and the description thereof. Algorithm execution continues from step 182 at step 184 where the error, computed at step 182, is compared with a threshold value as described hereinabove. If, at step 184, it is determined that the error computed in step 182 is less than the error threshold, algorithm execution continues at step 186 where the purported low engine output power condition is flagged as not having been verified. If, on the other hand, it is determined at step 184 that the error computed in step 182 is greater than or equal to the error threshold, algorithm execution continues at step 188 where the purported low engine output power condition is flagged as having been verified. From either of steps 186 or 188, algorithm execution continues at step 190 where algorithm 160 is either terminated or returns to a calling routine.

It should be apparent that steps 182–188 of algorithm 160 comprise one embodiment of step 130 of algorithm 100 (FIG. 3B), and that steps 182 may accordingly be performed either by an appropriate one of the computers 74, 78 or 12, or may be performed manually by service or maintenance personnel. While steps 182–188 illustrate one preferred technique for comparing the estimated actual engine output power computed in step 180 with a rated engine output power, those skilled in the art will recognize that other known comparison and/or error computational techniques may be used in determining a deviation of the estimated actual engine output power from the rated engine output power.

Figure 6:
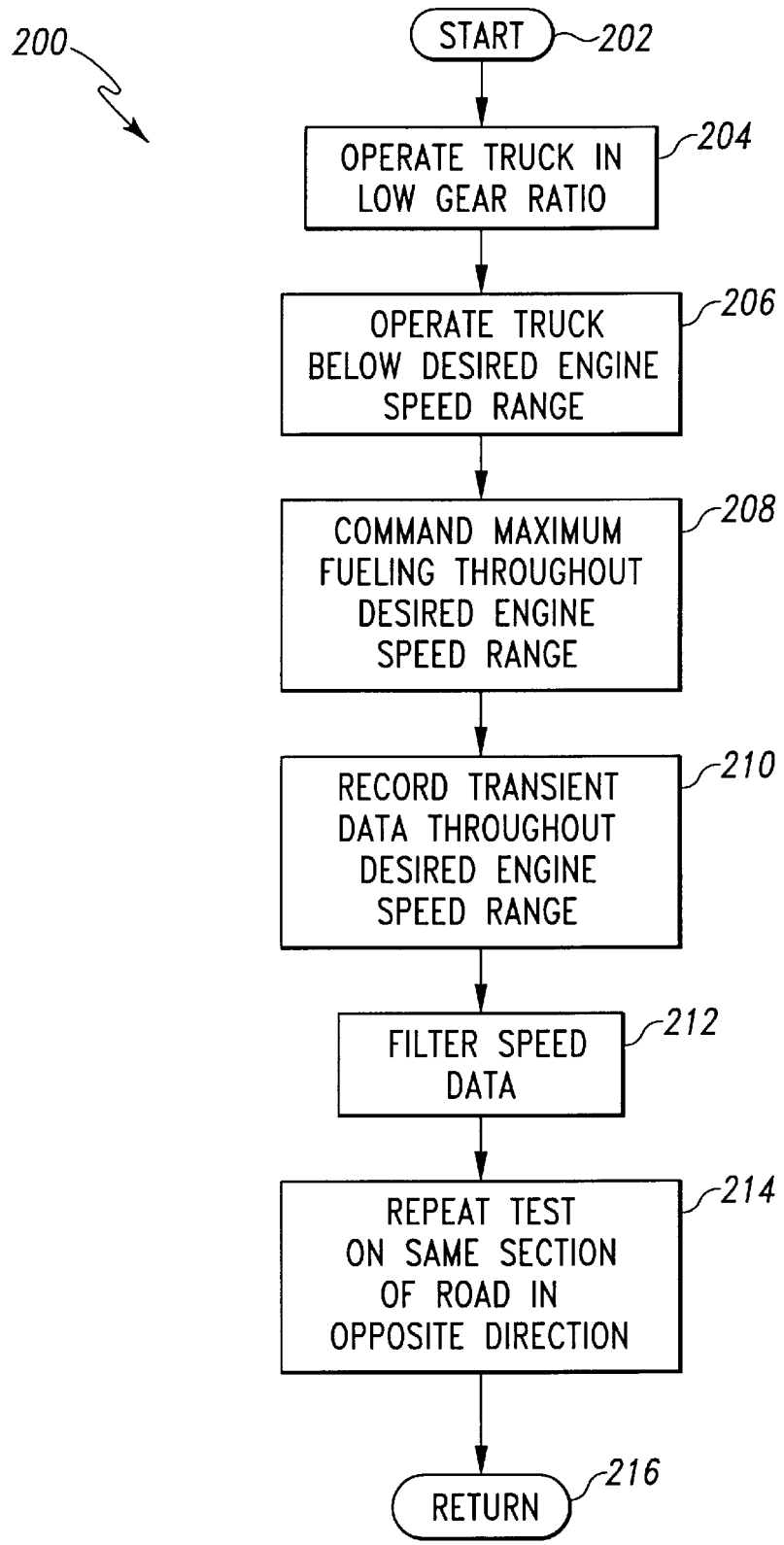
- FIG. 6 is a flowchart illustrating a software algorithm, executable by the system of FIG. 2, for performing one embodiment of a vehicle acceleration test according to the engine power output estimation algorithm of FIG. 5.

Referring now to FIG. 6, one embodiment of a software algorithm 200 for conducting the vehicle acceleration test of step 172 (FIG. 5A), is shown. Algorithm 200 begins at step 202, and at step 204, the vehicle 150 is operated along drive path 158 in a low gear ratio (i.e. numerically high gear). The drive path 158 is preferably a long, flat and straight stretch of road. In the event that transmission 16 is a semiautomatic transmission, it is preferable that the low gear ratio correspond to one of the numerically highest manually selectable gears. A numerically high gear (low gear ratio) is preferable since this will result in slower engine acceleration to permit longer test times and also to ensure sufficiently high boost pressure. Step 204 is typically performed by service or maintenance personnel.

Algorithm execution continues from step 204 at step 206 where the vehicle 150 is operated along drive path 158 at an engine speed below the desired range of engine test speeds. For example, if the desired engine speed range is between 1100–1800 RPM, step 206 requires operation of the engine 14 below this range, such as at 900 RPM. Thereafter at step 208, an appropriate one of the computers 74, 78 or 12 is operable to command maximum engine fueling (100% throttle) or accelerator pedal deflection, via control of the fueling signals provided to fuel system 62, throughout the desired engine speed range. At step 210, an appropriate one of the computers 74, 78 or 12 is operable to collect (record in memory) transient data relating to vehicle/engine operation throughout the desired engine speed range. Examples of transient data recorded throughout the desired engine speed range include, but are not limited to, time, engine speed, vehicle speed, commanded fuel, boost pressure, intake manifold air temperature, accessory operation status (climate control, air compressor, etc.) and any engine fault codes generated by diagnostics software resident within control computer 12. Each of the foregoing signals are provided via sensors and/or computer-generated signals as described hereinabove.

Algorithm execution continues from step 210 at step 212 where the raw engine speed data collected at step 210 is filtered to prepare such data for use in computing an estimated actual engine output power. Alternatively, the raw vehicle speed data collected at step 210 may be filtered at step 212 to prepare such data for use in computing an estimated actual engine output power, it being understood that engine speed data may be derived from vehicle speed data and vice versa, in accordance with well known equations. In either case, while any of a number of known software and/or hardware filters may be used to filter the engine speed data, step 212 is preferably performed in accordance with a filtering technique including data preprocessing, wherein an example of such a technique is described in co-pending U.S. patent application Ser. No. 08/770,793, filed by He and assigned to the assignee of the present invention, which application is incorporated herein by reference.

Algorithm execution continues from step 212 at step 214 where steps 204–212 are repeated along the same drive path 158 but in an opposite direction therealong. Results of the two acceleration tests are then preferably averaged to thereby minimize any effect that a gradient or other deviations in the drive path 158 may have upon the results. Thereafter, algorithm execution continues at step 216 where algorithm execution is terminated or returned to a calling routine.

Figure 7:
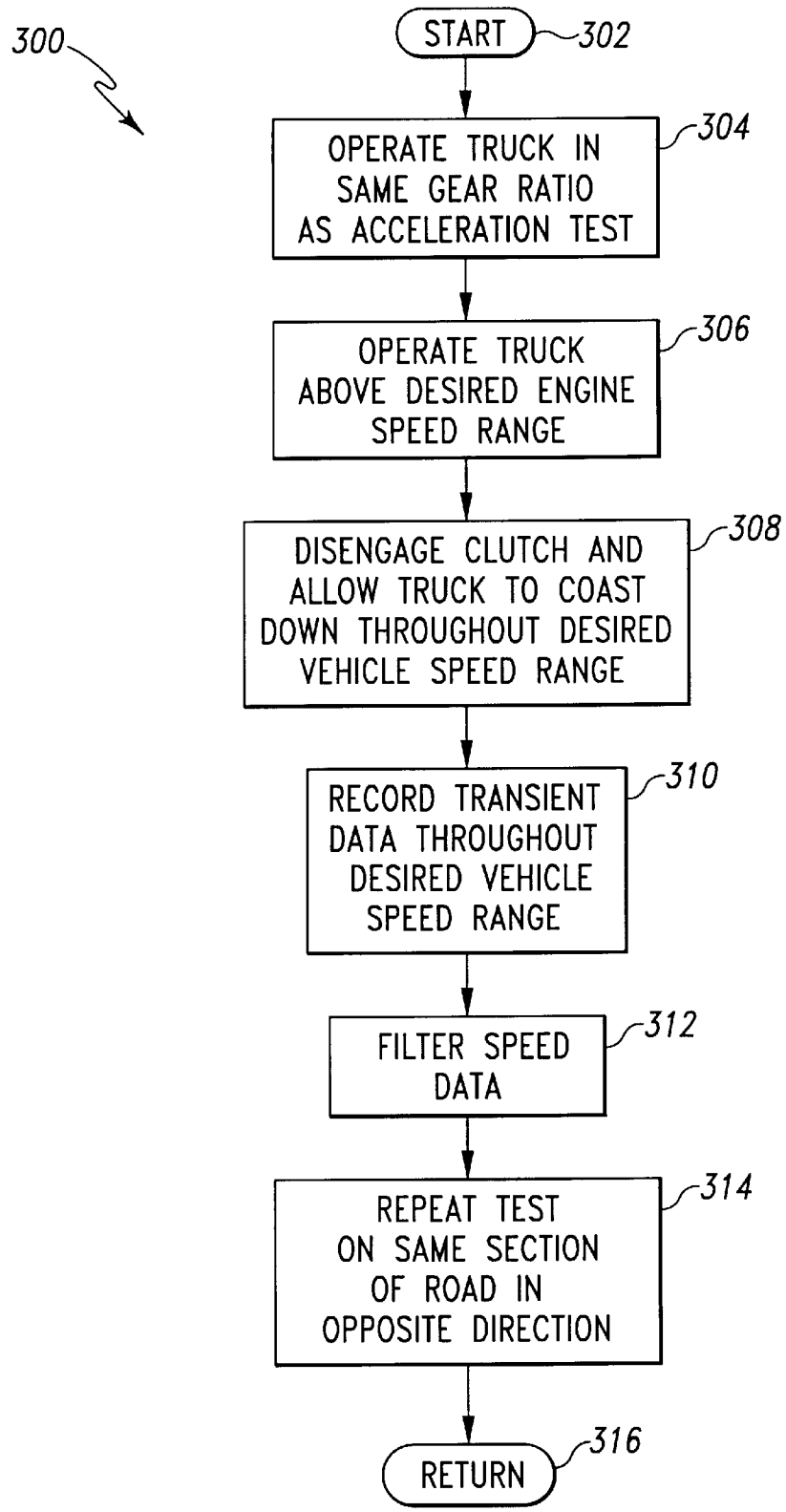
FIG. 7 is a flowchart illustrating a software algorithm, executable by the system of FIG. 2, for performing one embodiment of a vehicle coast-down test according to the engine power output estimation algorithm of FIG. 5.

Referring now to FIG. 7, one embodiment of a software algorithm 300 for conducting the vehicle coast down test of step 176 (FIG. 5B), is shown. Algorithm 300 begins at step 302, and at step 304, the vehicle 150 is operated along drive path 158 in a the same gear ratio as for the acceleration test of FIG. 6. Step 304 is typically performed by service or maintenance personnel.

Algorithm execution continues from step 304 at step 306 where the vehicle 150 is operated along drive path 158 at a vehicle speed corresponding to an engine speed above the desired range of engine test speeds. For example, if the desired engine speed range is between 1100–1800 RPM, step 306 requires an initial vehicle speed corresponding to an engine speed above this range, such as at 1900 RPM. Thereafter at step 308, the service or maintenance person disengages the clutch 42 (depresses the clutch pedal 40) and maintains the clutch 42 disengaged as the vehicle coasts down through a desired range of vehicle speeds corresponding to the desired engine speed range. At step 310, an appropriate one of the computers 74, 78 or 12 is operable to collect (record in memory) transient data relating to vehicle/engine operation throughout the desired vehicle speed range. Examples of transient data recorded throughout the desired vehicle speed range include, but are not limited to, time and vehicle speed. Each of the foregoing signals are provided via sensors and/or computer-generated signals as described hereinabove.

Algorithm execution continues from step 310 at step 312 where the raw vehicle speed data collected at step 310 is filtered to prepare such data for use in computing an estimated actual engine output power. While any of a number of known software and/or hardware filters may be used to filter the vehicle speed data, step 312 (as with step 212 of FIG. 6) is preferably performed in accordance with a filtering technique including data preprocessing, wherein an example of such a technique is described in co-pending U.S. patent application Ser. No. 08/970,793, filed by He and assigned to the assignee of the present invention.

Algorithm execution continues from step 312 at step 314 where steps 304–312 are repeated along the same drive path 158 but in an opposite direction therealong. Results of the two coast down tests are then preferably averaged to thereby minimize any effect that a gradient or other deviations in the drive path 158 may have upon the results. It is to be understood, however, that both the acceleration test of FIG. 6 and the coast down test of FIG. 7 need only be conducted in a single direction (the same direction) along the drive path 158 if weather conditions (including wind conditions) remain constant and the gradient of the drive path 158 is known. After step 314, if such a step is performed, algorithm execution continues at step 316 where algorithm execution is terminated or returned to a calling routine.

Data from the acceleration test of FIG. 6 includes information relating to the full engine power required to overcome all resistance forces, including inertia forces, tire and mechanical resistance forces, wind resistance forces, etc. Data from the coast down test of FIG. 7 includes information relating to all of the resistance forces present in the acceleration test except for the engine rotation inertia force and the engine friction force (since the clutch is disengaged during this test). By analyzing such data, an estimation of the actual engine output power over the desired engine speed range can be determined.

In accordance with another aspect of the present invention, details of derivations relating to the estimation of actual engine output power from data collected during the acceleration and coast-down tests of FIGS. 6 and 7 will now be described in detail. Thereafter, an example will be given in which such derivations are applied to an actual truck, and estimated actual engine output power results from an acceleration and coast-down test will be compared to a rated output power for that particular engine.

In a preferred embodiment, the acceleration and coast-down tests are structured around Newton's second law which states that force is equal to mass times acceleration (F=m*a). As this well known equation is applied to the present invention during the acceleration test, $$F_{ie} - F_{re} - m_v * g * \sin\alpha = m_e * a_{va} \qquad (2)$$

wherein $F_{ie}$ is an indicated engine force (driving force of the engine), $F_{re}$ is a total resistance force with the clutch 42 engaged and is equal to $F_{rv}+F_{fe}$, where $F_{rv}$ is a total resistance force of the vehicle and $F_{fe}$ is an engine friction force, $m_v$ is the mass of the vehicle, g is a known gravitational force constant, $\alpha$ is a ramp angle of the drive path of the vehicle, $m_e$ is an equivalent vehicle mass and is equal to $m_v+m_{iv}$, wherein $m_{iv}$ is an equivalent inertia mass of all rotational parts of the vehicle, and $a_{va}$ is the vehicle acceleration rate during the vehicle acceleration test. Newton's second law is also applied to during the coast-down test (with clutch 42 disengaged) as follows:

$$-F_{rv}-m_v*g*\sin\alpha=(m_e-m_{eng})*a_{vd} \quad (3)$$

wherein $F_{rv}$ is a total vehicle resistance force, $m_{eng}$ is an equivalent inertia mass of engine rotational parts, and $a_{vd}$ is the vehicle acceleration rate during the vehicle coast-down test. In general, the difference in total resistance force $F_{re}$ with the clutch 42 engaged vs clutch 42 disengaged is the engine friction force $F_{fe}$. Moreover, with the clutch 42 engaged and all other factors constant, the total resistance force of the vehicle $F_{rv}$ is only a function of vehicle speed (or engine speed). Thus, at any vehicle speed, $$F_{re}-F_{rv}=F_{fe} \quad (4)$$

In general, an engine effective output force $F_e$ acting on the vehicle (i.e. the net engine push force taking into account engine friction force $F_{fe}$) is given by the equation:

$$F_e=F_{ie}-F_{fe} \quad (5).$$

Substituting equation (4) into equation (5) and solving for $F_e$, and substituting equations (2) and (3) into this result yields the following equation for engine effective output force $F_e$ in terms of vehicle acceleration (collected during the vehicle acceleration test), vehicle deceleration (collected during the vehicle coast-down test) and inertial masses:

$$F_e=m_e*a_{va}-(m_e-m_{eng})*a_{vd} \quad (6).$$

The engine effective output force $F_e$ is related to engine output torque by the equation:

$$T_e=K(gr)*F_e \quad (7),$$

wherein $T_e$ is the engine output torque and K(gr) is a constant for a given gear ratio. Finally, engine output torque is related to engine output power by the equation:

$$P_e=T_e*K(Espd) \quad (8),$$

wherein $P_e$ is engine output power and K(Espd) is a constant for a given engine speed.

In accordance with a preferred embodiment of the present invention, $a_{va}$ (as a function of engine speed) is collected during the vehicle acceleration test of FIG. 6, $a_{vd}$ (as a function of engine speed) is collected during the vehicle coast-down test of FIG. 7, inertia quantities $m_e$ and $m_{eng}$ are computed based on physical properties of the engine and vehicle, and all such data is substituted into equation (6) to provide $F_e$ values as a function of engine speed. These results are substituted into either equation (7) or (8), and either estimated actual engine output torque (equation (7)) or estimated actual engine output power (equation (8)), as a function of engine speed, results. Equation (1) (or its equivalent equation for engine output power) can then be used to compare the estimated actual engine output torque or power with a rated engine output torque or power.

Experimental Example

An experimental vehicle acceleration and coast-down test was performed on a vehicle having an M11 Plus engine produced by Cummins Engine Company, Inc. of Columbus, Ind., wherein a tire rolling radius test was initially performed (see step 166 of FIG. 5A) which yielded 516 tire revolutions per mile. Transmission 16 comprises a 10 speed transmission having the following gear ratios:

8th Gear: 1:1.36
9th Gear: 1:1
10th Gear: 1:0.74, and an axle ratio of 3.9.

Engine acceleration rate (eng-acc) was computed for both the vehicle acceleration and vehicle coast-down tests, from collected engine speed and time readings, according to the equation:

$$\text{eng-acc}=\Delta(\text{eng-spd})/\Delta(\text{time}) \text{ [rpm/sec]} \quad (9),$$

wherein $\Delta$(eng-spd) is a change in engine speed and $\Delta$(time) is a change in time, and wherein eng-acc is provided in units of rpm/sec. Vehicle speed (veh-spd) is related to engine speed by the equation:

$$\text{veh-spd}=R_{tire\text{-}deformed\text{-}by\text{-}load}* (\Omega_{tire}/\omega_{eng})*\omega_{eng} \quad (10)$$

wherein $R_{tire\text{-}deformed\text{-}by\text{-}load}$=(1[mile]*1609 [m]/[mile])/ 516*2$\pi$=0.4963[m], $\omega_{tire}/\omega_{eng}$=gear ratio/axle ratio=1/ (1.36)*(3.9)=0.1885 in 8th gear, and 1/(1.0)*(3.9)=0.2564 in 9th gear, and ($\omega_{eng}$=2$\pi$*eng-spd [rpm]* 1/60[min]/[sec]= 0.1047 eng-spd [rad/sec]. Thus, in 8th gear, veh-spd= 0.009795*eng-spd [m/sec]=0.002192*eng-spd [mph], and in 9th gear, veh-spd=0.01332*eng-spd [m/sec]= 0.02981*eng-spd [mph].

Substituting the results of equation (10) into equation (9), vehicle acceleration (veh-acc) can be derived from engine acceleration. In 8th gear, veh-acc=0.09795*eng-acc [m/sec$^2$]=0.02192*eng-acc [mph/sec], and in 9th gear, veh-acc 0.01332*eng-acc [m/sec$^2$]=0.02981*eng-acc [mph/sec].

Neglecting the inertia of the transmission and tailshaft, the equivalent total vehicle inertia $m_e$ is calculated according to the following equation:

$$m_e=m_{total\text{-}vehicle\text{-}weight}+m_{equivalent\text{-}engine\text{-}inertia}+ m_{equivalent\text{-}tire\text{-}inertia} \quad (11)$$

wherein $m_{total\text{-}vehicle\text{-}weight}$ for the test vehicle, including fully loaded trailer, was determined by weighing the vehicle and trailer on a scale, and was determined to weigh 76250 [1b]=34587 [kg]. The equivalent engine inertia, $m_{equivalent\text{-}engine\text{-}inertia}$, is determined in accordance with Newton's second law as:

$$m_{equivalent\text{-}engine\text{-}inertia}=[I_{eng}* (\omega_{eng}/(\omega_{tire})^2]/R^2_{tire} \quad (12),$$

wherein $I_{eng}$ is engine inertia and $R_{tire}$ is the radius of the tires deformed by load. For an M11 Plus engine, $I_{eng}$=19.945 [kg.m$^2$], so in 8th gear, $m_{equivalent\text{-}engine\text{-}inertia}$=2279 [kg], and in 9th gear, $m_{equivalent\text{-}engine\text{-}inertia}$=1232 [kg]. The equivalent tire inertia, $m_{eqivalent\text{-}tire\text{-}inertia}$, can be determined by the equation $I_{tires}/R_{tires}$, where, for 18 tires $I_{tires}$=262.6. Thus, $m_{eguivalenttire\text{-}inertia}$=1066 [kg].

Engine output torque $T_e$ in this case is given by the equation:

$$T_e=(30*F_e*\text{veh-spd})/\pi*\text{eng-spd} \quad (13),$$

so that in 8th gear, $$T_e=(30*0.009795/\pi)*F_e=0.0935*F_e \quad (14),$$

and in 9th gear, $$T_e=(30*0.01332/\pi)*F_e=0.1272F_e \quad (15).$$

Figure 8:
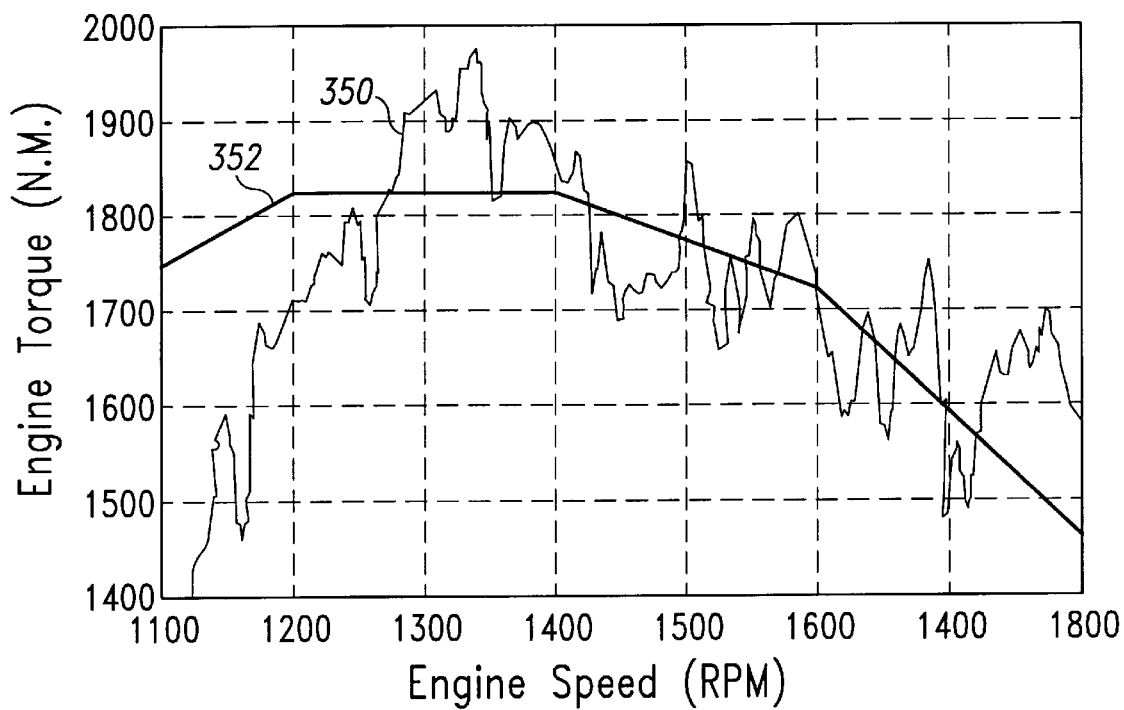
FIG. 8 is a plot of estimated engine output torque and rated engine output torque vs speed, resulting from the algorithm illustrated in FIGS. 5–7.

In the vehicle acceleration coast down tests for the test vehicle, time data and engine speed data were collected, and $F_e$ was computed as a function of engine speed using equation (6) above. The $F_e$ values were then inserted into equation 13 and a $T_e$ vs engine speed plot was generated. The engine speed range of interest in this case was from 1100 RPM to 1800 RPM. The resulting estimated actual engine output torque curve 350, as a function of engine speed, is shown in FIG. 8. Also shown in FIG. 8 is a trace of rated engine output torque 352 for an M11 Plus engine (i.e. the advertised torque curve for this engine). Using equation (1), it was determined that the estimated actual engine output torque 350 is within 5% of the rated engine output torque 352.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A method of diagnosing output power of an internal combustion engine having a number of cylinders, a fueling system responsive to fueling signals to fuel the engine and means for providing the fueling signals, the method comprising the steps of:

investigating existence of a low engine output power condition and performing the following steps only if said low engine output power condition exists;

correcting relative compression values of each of the number of cylinders having a relative compression value below a predefined relative compression value;

adjusting the fueling signals to balance a relative contribution to engine output power of each of the number of cylinders; and operating a vehicle carrying the engine along a drive path, including accelerating and coasting the vehicle through a desired vehicle speed range, and estimating an actual engine output power over the desired engine speed range using data collected during the accelerating and the coasting.

2. The method of claim 1 further including the step of:

comparing the estimated actual engine output power over the desired engine speed range to a rated engine output power over the desired engine speed range and verifying existence of the low engine output power condition if the rated engine output power over the desired engine speed range exceeds the estimated actual engine output power over the desired engine speed range by an error value.

3. The method of claim 2 wherein the engine further includes engine calibration data associated therewith;

and wherein existence of said low engine output power condition is conditioned upon the engine calibration data matching engine calibration data appropriate for the engine and vehicle.

4. The method of claim 1 wherein the engine includes a cranking system operable to crank the engine and means for sensing engine speed and providing an engine speed signal corresponding thereto;

and wherein the step of correcting relative compression values of each of the number of cylinders includes:

commanding the fueling signals to produce a zero engine fueling condition;

commanding the cranking system to crank the engine;

sensing engine speed; and processing the engine speed data to determine a relative compression value for each of the number of cylinders.

5. A method of estimating actual output power of an internal combustion engine mounted in a vehicle and connected to a transmission having a number of selectable gear ratios, the engine having a fueling system responsive to fueling signals to fuel the engine, means for a providing the fueling signals and an engine speed sensor responsive to engine speed to provide an engine speed signal, and a means for sensing vehicle speed and providing a vehicle speed signal corresponding thereto, the method comprising the steps of:

starting and warming up the engine;

engaging the engine with a numerically low gear ratio of the transmission;

accelerating the vehicle along a drive path and through a desired engine speed range while collecting one of engine speed and vehicle speed data;

coasting the vehicle along the drive path and through a desired vehicle speed range corresponding to the desired engine speed range while collecting vehicle speed data; and processing the speed data collected during the accelerating and coasting steps and computing therefrom an estimate of actual engine output power over the desired engine speed range.

6. The method of claim 5 wherein the step of accelerating the vehicle includes accelerating the engine under maximum fueling conditions through the desired engine speed range.

7. The method of claim 5 wherein the engine includes a first temperature sensor responsive to engine operating temperature to provide an engine temperature signal;

and wherein the step of starting and warming up the engine includes the steps of:

starting the engine;

sensing engine temperature; and monitoring the engine temperature signal and performing the engaging, accelerating, coasting and processing steps only after the engine temperature exceeds a threshold temperature.

8. The method of claim 5 wherein the vehicle includes a number of tires mounted thereto;

and wherein the method further includes the step of performing a tire rolling radius test to determine a number of tire revolutions for a predefined traveling distance;

and wherein the processing step further includes processing the number of tire revolutions for a predefined traveling distance in computing the estimate of actual engine output power over the desired engine speed range.

9. The method of claim 5 wherein the vehicle includes a climate control system and the engine includes an air compressor associated therewith;

and further including the steps of:

monitoring the climate control system during the accelerating and coasting steps; and discarding all speed data collected during the accelerating and coasting steps and repeating the accelerating and coasting steps if the climate control system is detected as being active during either of the accelerating and coasting steps.

10. The method of claim 9 further including the steps of:

monitoring the air compressor during the accelerating and coasting steps; and discarding all speed data collected during the accelerating and coasting steps and repeating the accelerating and coasting steps if the air compressor is detected as being active during either of the accelerating and coasting steps.

11. The method of claim 5 wherein the accelerating step includes accelerating the vehicle along the drive path in a first direction;

and further including the steps of:

accelerating the vehicle along the drive path in a second direction opposite the first direction and through the desired engine speed range while collecting one of engine speed and vehicle speed data; and averaging the engine or vehicle speed data collected in the two accelerating steps.

12. The method of claim 11 wherein the engine further includes a boost pressure sensor operable to sense boost pressure and provide a boost pressure signal corresponding thereto;

and wherein the two accelerating steps each further include collecting boost pressure data while accelerating the vehicle along the drive path through the desired engine speed range.

13. The method of claim 12 wherein the two accelerating steps each further include collecting fueling data related to the fueling signals while accelerating the vehicle along the drive path through the desired engine speed range.

14. The method of claim 13 wherein the engine further includes an intake manifold air temperature sensor operable to sense intake manifold air temperature and provide an intake manifold air temperature signal corresponding thereto;

and wherein the two accelerating steps each further include collecting intake manifold air temperature data while accelerating the vehicle along the drive path through the desired engine speed range.

15. The method of claim 14 wherein the two accelerating steps each further include collecting data related to the numerically low gear ratio of the transmission engaged with the engine throughout the accelerating test.

16. The method of claim 5 wherein the coasting step includes coasting the vehicle along the drive path in a first direction;

and further including the steps of:

coasting the vehicle along the drive path in a second direction opposite the first direction and through the desired vehicle speed range while collecting vehicle speed data; and averaging the vehicle speed data collected in the two coasting steps.

17. A method of estimating actual output power of an internal combustion engine mounted in a vehicle and connected to a transmission having a number of selectable gear ratios and a clutch for engaging and disengaging the gear ratios, the engine having a fueling system responsive to fueling signals to fuel the engine, means for a providing the fueling signals, an engine speed sensor responsive to engine speed to provide an engine speed signal and a vehicle speed sensor responsive to vehicle speed to provide a vehicle speed signal, the method comprising the steps of:

engaging the engine with a numerically low gear ratio of the transmission;

accelerating the vehicle along a drive path and through a desired engine speed range under maximum engine fueling conditions while collecting one of engine speed and vehicle speed data;

coasting the vehicle along the drive path and through a desired vehicle speed range corresponding to the desired engine speed range with the clutch disengaged while collecting vehicle speed data; and processing the speed data collected during the accelerating and coasting steps and computing therefrom an estimate of actual engine output power over the desired engine speed range.

18. The method of claim 17 wherein the vehicle includes a number of tires mounted thereto;

and wherein the method further includes the step of performing a tire rolling radius test to determine a number of tire revolutions for a predefined traveling distance;

and wherein the processing step further includes processing the number of tire revolutions for a predefined traveling distance in computing the estimate of actual engine output power over the desired engine speed range.

19. The method of claim 18 wherein the processing step includes:

processing the speed data collected during the accelerating and coasting steps to produce a vehicle acceleration rate;

computing a total vehicle inertia as a function of at least a mass of the vehicle, engine inertia and tire inertia;

computing a push force of the engine as a function of the vehicle acceleration, the total vehicle inertia and a resistance force of the engine; and computing the estimate of the actual engine output power as a function of the push force of the engine.

20. A method of diagnosing output power of an internal combustion engine having a number of cylinders, a fueling system responsive to fueling signals to fuel the engine and means for providing the fueling signals, the method comprising the steps of:

providing means for sensing engine speed and providing an engine speed signal corresponding thereto, and means for sensing vehicle speed and providing a vehicle speed signal corresponding thereto:

investigating existence of a low engine output power condition and performing the following steps only if said low engine output power condition exists, correcting relative compression values of each of the number of cylinders having a relative compression value below a predefined relative compression value, adjusting the fueling signals to balance a relative contribution to engine output power of each of the number of cylinders: and operating a vehicle carrying the engine along a drive path and estimating therefrom an actual engine output power over a desired engine speed range, including:

accelerating the vehicle along the drive path and through the desired engine speed range while sensing one of engine speed and vehicle speed:

coasting the vehicle along the drive path and through a desired vehicle speed range corresponding to the desired engine speed range while sensing vehicle speed: and processing the speed information sensed during the accelerating and coasting steps and computing therefrom estimate of the actual engine output power over the desired engine speed range.

21. A method of diagnosing output power of an internal combustion engine having a number of cylinders, a fueling system responsive to fueling signals to fuel the engine and means for providing the fueling signals, the method comprising the steps of:

investigating existence of a low engine output power condition and performing the following steps only if said low engine output power condition exists:

correcting relative compression values of each of the number of cylinders having a relative compression value below a predefined relative compression value, altering the fueling signals to cut fuel delivery to one of the number of cylinders;

accelerating the engine:

computing an engine acceleration rate while accelerating the engine:

altering the fueling signals to cut fuel delivery to different ones of the number of cylinders and repeating the accelerating and computing steps to thereby compute an engine acceleration rate while fuel delivery is cut to a different one of each of the number of cylinders;

comparing engine accelerations rates computed with fuel cut to each of the number of cylinders and computing therefrom a corresponding relative output power contribution of each of the number of cylinders;

adjusting the fueling signals to equalize the relative output power contribution of each of the number of cylinders to overall engine operation; and operating a vehicle carrying the engine along a drive path and estimating therefrom an actual engine output power over a desired engine speed range.

22. The method of claim 20 wherein the engine includes means for sensing engine speed and providing an engine speed signal corresponding thereto;

and wherein the accelerating step further includes accelerating the engine from an idle speed to a maximum engine speed;

and wherein the computing step further includes computing an engine acceleration rate while accelerating the engine from the idle speed to the maximum engine speed.

* * * * *